(12) United States Patent
Supplisson et al.

(10) Patent No.: US 9,009,665 B2
(45) Date of Patent: *Apr. 14, 2015

(54) AUTOMATED TAGGING AND TRACKING OF DEFECT CODES BASED ON CUSTOMER PROBLEM MANAGEMENT RECORD

(71) Applicant: International Business Machines Corporation, Armonk, NY (US)

(72) Inventors: Thierry Paul Rene Supplisson, Grange Douglas (IE); Eric Arthur Fernandez, Petaling Jaya (MY); Ming Loong Lee, Petaling Jaya (MY); Ravi Nallappan, Selangor (MY); Eng Seng Yeo, Selangor (MY)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,942

(22) Filed: Mar. 1, 2013

(65) Prior Publication Data

US 2013/0311975 A1    Nov. 21, 2013

Related U.S. Application Data

(63) Continuation of application No. 13/472,606, filed on May 16, 2012.

(51) Int. Cl.
*G06F 11/36* (2006.01)
*G06F 9/44* (2006.01)

(52) U.S. Cl.
CPC .......... *G06F 11/362* (2013.01); *G06F 11/3604* (2013.01); *G06F 8/71* (2013.01)

(58) Field of Classification Search
USPC ......................................................... 717/121
See application file for complete search history.

(56) References Cited

U.S. PATENT DOCUMENTS

| | | | |
|---|---|---|---|
| 6,336,217 B1 | 1/2002 | D'Anjou et al. | |
| 7,503,037 B2 | 3/2009 | Banerjee et al. | |
| 2005/0097396 A1 | 5/2005 | Wood | |
| 2011/0107419 A1* | 5/2011 | Vidal et al. | 726/22 |
| 2011/0246968 A1* | 10/2011 | Zhang et al. | 717/125 |
| 2011/0307862 A1 | 12/2011 | Abrams et al. | |
| 2011/0321007 A1* | 12/2011 | Marum et al. | 717/113 |

OTHER PUBLICATIONS

B. Ashok, Joseph Joy, Hongkang Liang, Aug. 23, 2009, Debug Advisor: A Recommender System for Debugging, http://research.microsoft.com/pubs/101301/esec099-ashok.pdf.*

* cited by examiner

*Primary Examiner* — John Chavis
(74) *Attorney, Agent, or Firm* — Jeffrey S. LaBaw; David H. Judson

(57) ABSTRACT

A routine for tagging and tracking source code may be implemented in a software development environment. The routine begins upon the identification of a defect in a software product or system. Once the defect has been identified and rectified, a search of other source code (typically located in a source code management system that supports version control) is specified. Using the search specification, the system automatically identifies the code snippet to be searched and begins searching the identified codebase for duplicates. A ticket or service record is then created for every duplicate/similar code snippet found during the search. The ticket/record enables software defect tracking to be carried out on the newly-located instances of the code. The system also automatically manages the code snippets identified by the duplicate detection.

8 Claims, 3 Drawing Sheets

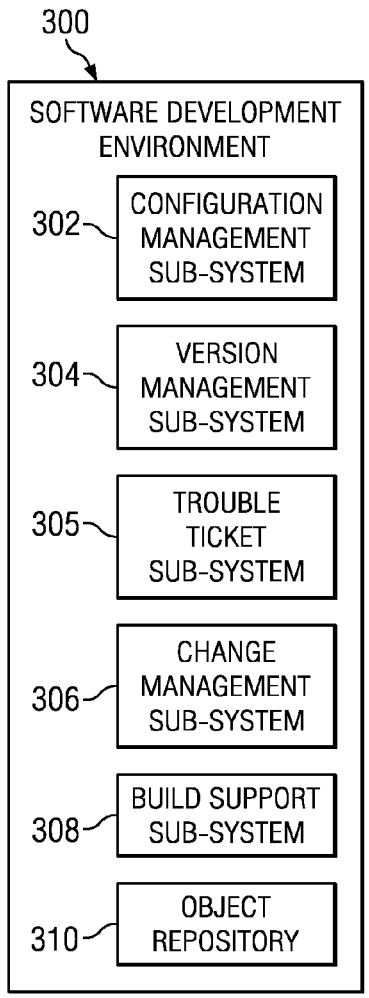
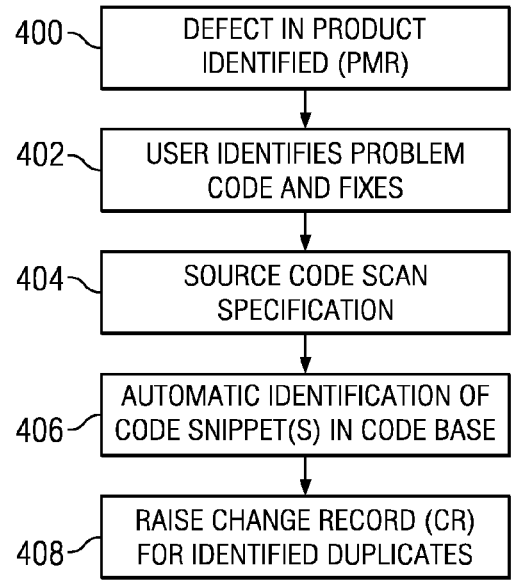
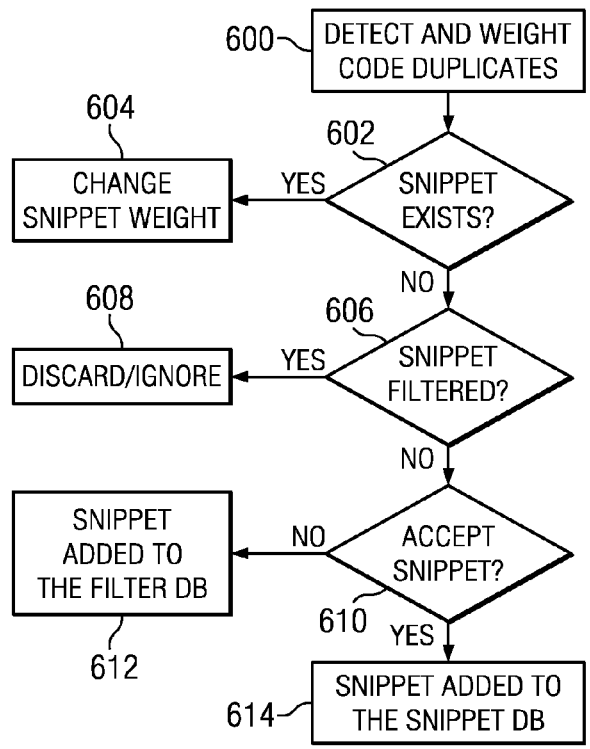

AUTOMATED TAGGING AND TRACKING OF DEFECT CODES BASED ON CUSTOMER PROBLEM MANAGEMENT RECORD

BACKGROUND OF THE INVENTION

1. Technical Field

This disclosure relates generally to software development and, in particular, to identifying and managing source code snippets that have been identified as having defects.

2. Background of the Related Art

Software developers utilize integrated development environments (IDEs) to develop and debug software. Prior to the current reliance on such IDEs, software developers needed to use separate and distinct tools for syntax checking their code, compiling, debugging, handling version control, and so forth. Modern software IDEs typically merge all this functionality so that software developers do not see (and need not be distracted by) such separate and distinct tools.

During the development process, software developer teams often collaborate on a set of artifacts, which are typically referred to as "source code." Using an IDE framework, teams can make changes to these artifacts regularly, and the changes are then shared. To facilitate this process, a team development environment often includes the following software systems: configuration management, version management, change management, as well as build support. The software configuration management (SCM) systems are utilized to manage the artifacts. These systems help developers in many ways, such as tracking the revision history of these artifacts, ensuring that developers have access to appropriate configurations of these artifacts, making developers aware of changes made by others on their team to other source artifacts, helping them obtain these changes in their work environment, and so forth.

Once the developed software is completed and is in use, the change management software is used for software defect tracking. In a typical use case, once a defect (or bug) is reported from a customer (or otherwise), a support escalation path is traversed. At some point within a support matrix (or other defect handling procedure), a defect report is escalated to a support engineer or developer for assistance. When that person (sometimes referred to herein as a user) looks into the issue and finds it to be a valid defect, he or she typically does a code scan (e.g., based on logs gathered from the field) and correlates the results to the flow of how the code logic works or was designed to work. In the event that a particular code snippet is identified to be the cause of a bug, the developer may then address the defect.

While this approach may resolve the particular defect satisfactorily, the defect may not be an isolated issue. There may be many other instances of the code running throughout a set of code (a "codebase") or in other software systems but where, due to the nature of the defect or due to other reasons, the defect has not been triggered, logged or otherwise noticed. In a typical support organization, the rule of thumb is to correct a defect against the product (or code) it is logged against. As a result, the continued use of the original code in these other systems may give rise to future support issues.

BRIEF SUMMARY

This disclosure describes a method to identify potentially problematic code snippets in a software system so that code fixes may be applied to these snippets as necessary. The approach is initiated once problem code is identified and repaired. According to this disclosure, following code identification and correction, an automated scan of potentially impacted code in carried out to identify code duplicates (or substantial duplicates). For every duplicate/similar code instance located, a ticket or service record is created and maintained, preferably with a local change management system, to facilitate software defect tracking and correction.

In one particular embodiment, an automated tagging and tracking routine begins upon the identification of a defect in a software product or system, typically upon creation of a customer or field management record. Once the defect has been identified and rectified, a search of other source code (typically located in a source code management system that supports version control) is specified. Using the search specification, the system automatically identifies the code snippet to be searched and begins searching the identified codebase. A ticket or service record (preferably in a local change management system) is then created for every duplicate/similar code snippet found during the search. The ticket/record enables software defect tracking to be carried out on the newly-located instances of the code.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates a known software development environment in which the subject matter of this disclosure may be implemented or associated;

FIG. 4 illustrates a high level process flow of this disclosure;

FIG. 6 depicts a duplicate code snippet management routine according to this disclosure.

DETAILED DESCRIPTION OF AN ILLUSTRATIVE EMBODIMENT

Figure 1:
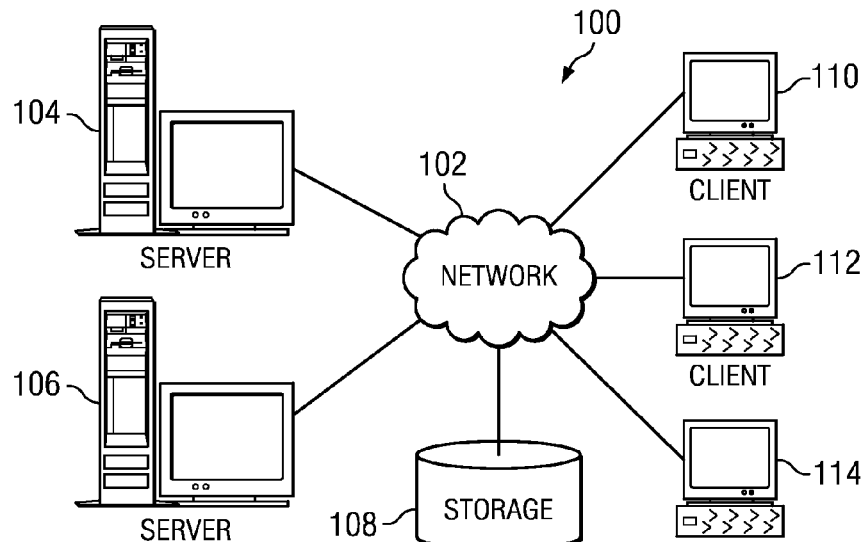
FIG. 1 depicts an exemplary block diagram of a distributed data processing environment in which exemplary aspects of the illustrative embodiments may be implemented.
Figure 2:
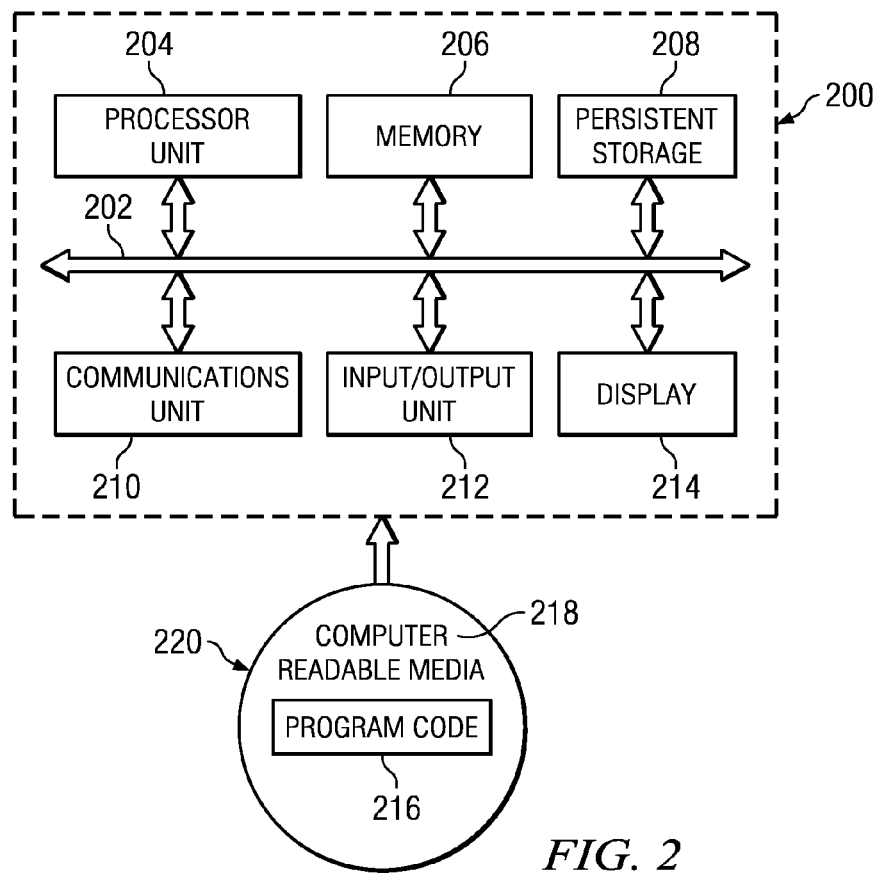
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data.

Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. In such an approach, end users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In the alternative, the techniques described herein may operate within a standalone data processing system, or within the context of a "cloud" environment wherein computing resources are shared among a number of entities.

Integrated Development Environments

With reference to FIG. 3, a typical software development environment 300 may include a number of logical or functional components or component systems: a configuration management sub-system 302, a version management sub-system 304, a trouble ticket sub-system 305, a change management sub-system 306, and a build sub-system 308. An object repository 310 is provided to store source code, typically in the form of full source code version(s), code snippets, and other code artifacts. One or more of these components may be implemented in a data processing system such as shown in FIG. 2. One or more of these components may be located in proximity to one another or remotely from one another. While the components are shown separately, this is not a limitation, as one or more of these components may be integrated with one another or use shared programs and data. A particular sub-system may be implemented using client-server architecture, such as shown in FIG. 1. The environment 300 may include other machines, applications, servers, databases, user interfaces, programmatic interfaces, utilities and tools. These sub-systems, together with their associated interfaces, tools, databases and the like, enable one or more development and support teams to develop and maintain software programs, typically multi-tier, multi-language applications that are designed to execute on a cross-platform basis. Although not meant to be limiting, a representative software development environment, which is available as open source, is Eclipse, which comprises an integrated development environment (IDE) and an extensible plug-in system. This environment can be used to develop programs in various languages including Java, Ada, C, C++, COBOL, Perl, PHP, Python, and others. A commercial alternative is IBM® Rational® Software Architect, which is an application design and development tool. This provides a comprehensive modeling and development environment that uses the Unified Modeling Language (UML) for designing architecture for C++ and Java 2 Enterprise Edition (J2EE) applications and web services. This system is built on the Eclipse open source software framework and includes capabilities for architectural code analysis, C++, and model-driven development (MDD) with the UML for creating resilient applications and web services. The object repository may store development data including reusable parts, such as JavaBeans and ActiveX, source code such as C++, COBOL and Java, web applets, HTML documents, end user documentation, test cases, and modeled objects.

Typically, the development environment includes tools and mechanisms to enable developers to access code artifacts, to "check-out" an artifact, to make changes to the source code, to "check-in" the modified artifact, to mediate changes made to the artifact by multiple developers operating on different teams, to interface with change control and version control components for tracking and other administrative purposes, and so forth. The environment also may include a snippet management system.

Automated Tagging and Tracking of Defective Code Snippets

With the above as background, the techniques of this disclosure are now described. When a defect is reported from a customer, it is typically escalated to a support engineer for assistance. Using existing IDE tools or the like, the support engineer evaluates that issue. If he or she finds it to be a valid defect, a code scan is initiated. Typically, a code scan is based on logs that are gathered from the field. The results of the scan are then correlated to the flow of how the code logic works. In the event that a particular code snippet is identified to be the cause of the bug, it is then fixed, by the engineer, a developer, or another person (the "user"). This is a conventional operation.

According to this disclosure, an additional operation is then performed because the impacted code may also exist in other code modules or systems of which the user might not even be aware. Typically, and prior to the technique disclosure herein, this lack of knowledge arises because the original defect is only logged against the specific code module in question (i.e. in which the problem arose). A consequence of not performing this additional operation (as will be described below) on other modules is the likelihood that future bugs will occur in these other modules, and this will incur additional support expense and complexity. This disclosure addresses this problem.

In particular, and according to this disclosure, upon correction of the underlying defect, an automatic scan is made in a repository of the entire source, or a defined subset of the source code, to identify all instances of potential or determined problematic source code. This scan searches for instances of the original source code (prior to its correction), or variants of that code. Any such instances located by the scan are considered by the system to be potentially problem code. The system then tracks each instance of such problem code found, preferably by raising a service record (SR) or change record (CR) with a local change management system. In the alternative, a notification of the problematic code is sent via other means, such as via e-mail, SMS, MMS, or other IP-based message.

In general, a high level flow of operations of the automated tagging and tracking routine described above is shown in FIG. 4, which is now described.

The routine begins at step 400 upon the identification of a defect in a software product or system. In the usual case, the defect is noted as a consequence of receiving a customer problem management record (PMR), or its equivalent, in a bug tracking (or other trouble ticketing) system. Generalizing, a record of this type is sometimes referred to as a "ticket" or "trouble ticket." At step 402, the user (typically, a support engineer, a developer who has received a referral from an engineer, or the like) identifies the defect in the source code and performs the necessary fix or fixes. Steps 400 and 402 are conventional. At step 404, the user then defines a search range by selecting to scan all source code or a defined subset, typically from a source code management (SCM) system that supports version control. This search specification may include other information, such as the name of the code, time and date, search data, code details, and the like. Step 404 is optional. At step 406, the system automatically identifies the code snippet to be searched and begins searching the identified codebase. At step 408, a ticket or service record is then created for every duplicate/similar code snippet found. The ticket/record enables software defect tracking to be carried out on the newly-located instances of the code. This completes the process.

Figure 5:
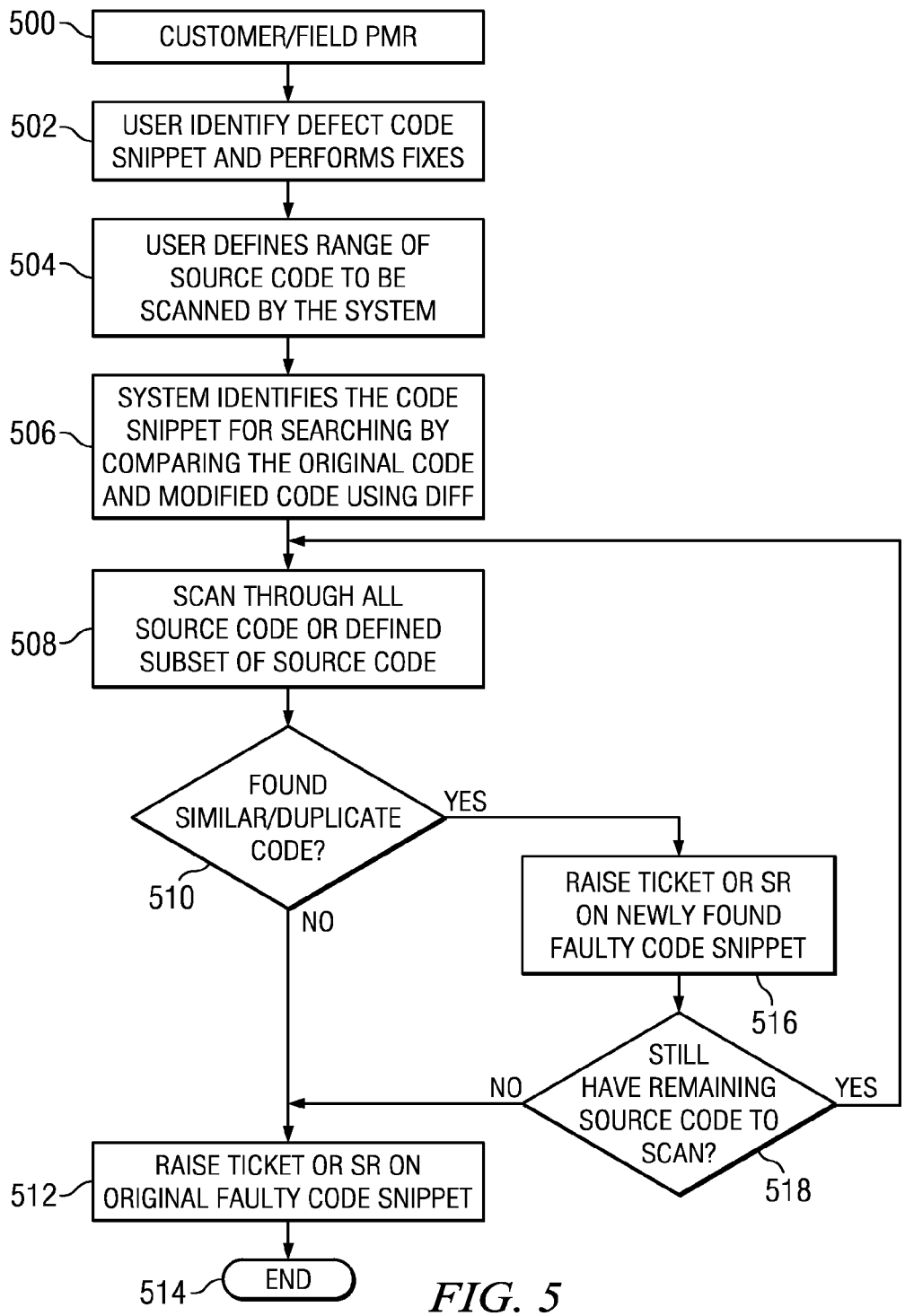
FIG. 5 illustrates a more detailed process flow for automated tagging and tracking of defective source code snippets according to this disclosure.

FIG. 5 illustrates the tagging and tracking routine in more detail. The routine begins at step 500 upon the creation (against a reported defect or problem) of a customer or field problem management record (PMR) or, more generally, a trouble ticket. The ticket may be created manually or in an automated manner. At step 502, and assuming that the ticket has been escalated to a developer in connection with a support matrix, the developer undertakes to identify the defect in the code and to perform an appropriate fix or correction. Once complete, the routine continues at step 504 with the user (or the system, in an automated manner) defining a range of available source code that should then be scanned to identify additional instances of the impacted (and now corrected) code. At step 506, the system identifies the code snippet for searching by comparing the original code (in which the defect was logged) and the modified code. This operation may be carried out in any convenient manner, such as by using a code differencing algorithm. As a result, a code snippet to be search is identified, and the routine continues at step 508. At this step, a scan is carried out with respect to the code snippet through all of the available source code or, at the very least, with respect to a defined subset of that source code. The routine then continues at step 510 to determine whether the scan located similar or duplicate instances of the code snippet. If the result of the test at step 510 is negative (meaning that no similar or duplicate instances of the code snippet were located), the routine continues at step 512 by raising a ticket, change record (CR) or service record (SR) for the original faulty code snippet. The routine then ends at step 514. If, however, the result of the test at step 510 is positive (meaning that one or more similar or duplicate instances of the code snippet were located), however, the routine continues at step 516 by raising a ticket, change record (CR) or service record (SR) for the newly-found faulty code snippet. The routine then continues in this processing path at step 518 to determine whether there is remaining source code to scan. If the outcome of the test at step 518 is positive (meaning that there is more source code to scan), the routine branches back to step 508, and it cycles in the manner previously described. If, however, the outcome of the test at step 518 is negative (meaning that there is no more source code to scan), the routine continues at 512 (previously described) by raising a ticket, change record (CR) or service record (SR) for the original faulty code snippet. The routine then ends at step 514.

Thus, the technique described herein provides automation of source code scanning to detect duplication/similar portions of defective code, together with tracking preferably each instance of defective code found; such tracking preferably is done by the system automatically raising a service record/change record in a given system (e.g., the local change management sub-system, or the like).

As described above, the automated routine of this disclosure check performs a scan to locate duplicate/similar codes. Detection of duplicate/similar code may be character-by-character based, line-by-line based, line-by-line based with white space characters removed, token-by-token based, functionality-based, or the like. There are many known techniques that may be used for this purpose, such as differencing, basic string searching, string searching using hashing (such as the Rabin-Karp algorithm), visual clone detection, syntax tree comparisons, and the like. The duplicate detection typically is performed in an automated manner, and it results in one or more instances of problem code that corresponds (within some configurable degree of similarity) to the defect source code prior to its correction. This problem code is sometimes referred to herein as a clone.

Generalizing, the system of this disclosure preferably uses some duplicate code snippet scanning technology. The approach may use an existing snippet management tool, such as the Eclipse Snippet Management tool; in the alternative, the code duplication function may be part of a separate tool, module, mechanism or sub-system. There may be an existing snippet management system and associated database, such as the object repository 310 shown in FIG. 3, which includes code snippets ("anti-snippets") that have been found to be problematic (as having been associated with existing software faults and resolution). Information or metadata about the snippets is assumed to be available from the repository. This information typically includes the origin of the code the snippet was taken from, the location of that code, links to the ticket records in a trouble ticketing system, and the like. The information may also include a "weight" value attached to a particular code snippet that identifies a characteristic or property about the snippet, e.g., how many times the snippet has been identified as potentially problematic in a prior scan. During a current scan for duplicate code, if a duplicate is already in the snippet database, information about the code (e.g., the associated defect, the fix, or the like) may be added to the repository and the weight adjusted accordingly. Some code snippets, even if they are found to be the cause of a defect, may not be added to the snippet repository. If the duplicate is marked for such filtering, it is ignored. If certain use cases, the user may be afforded an opportunity to add the snippet to the repository or, in the alternative, to add the snippet to a list of snippets that should be filtered.

FIG. 6 illustrates a representative technique to manage code snippets based on code duplication detection. As noted above, preferably the routine is initiated during a scan for problematic code, where that code was identified as a result of a bug/defect report. At step 600, the routine detects and weights a code snippet that has been identified as a duplicate. A test is then performed at step 602 to determine whether the detected duplicate already exists in the code snippet repository. If the result of the test at step 602 is positive (meaning that the code snippet already exists), the routine branches to step 604 to change the snippet's weight (due to the fact that it has been associated with a defect or bug). If, however, the result of the test at step 602 is negative (meaning that the code snippet does not already exist in the repository), the routine continues at step 606 to determine whether the snippet is on a list of snippets that should be filtered (and not added to the database). If so, the routine branches to step 608, in which case the snippet is discarded or ignored (and, thus, it is not added into the snippet repository). Following a negative outcome of the test at step 606, the routine tests at step 610 whether the code snippet (which is a duplicate, but which is not in the repository and is not to be ignored) should be accepted into the repository. If not, data identifying the code snippet is added to the list of snippets to be filtered at step 612; if, however, the code snippet is to be accepted in the repository, the routine continues at step 614 to add the code snippet to the snippet database. This completes the snippet management routine.

The results of the code duplication detection that occurs after the resolution of a problem preferably are added to a historical database and checked against the code base regularly. Preferably, findings are also checked against existing trouble tickets to avoid repetition of tickets related to similar problems. If a duplicate is found, and if this duplicate is already linked to a trouble ticket, the two tickets may be automatically associated to facilitate a root cause analysis to be initiated.

In addition, the system and method may be extended to provide additional management of code snippets. Thus, for example, a fix to the code (as a result of trouble ticket being raised) may identify one or more pieces of code that have been changed and how they overlap (or interoperate) with existing code snippets that can be found by duplicate detection across the codebase.

The techniques described above provide significant advantages. Preferably, the approach is driven from input from trouble tickets (e.g., Customer Problem Management Records (PMR)) or the like, which are commonly used to raise product issues. Following identification and fix of the defect, duplicate or similar code snippets throughout the source code environment are tagged. Subsequently, these changes are tracked within a software development environment for prompt or immediate fix by the software development team. The technique automates the tedious task of identifying defects in source code. Users can now efficiently save time and manpower and direct more effort into fixing the actual defects itself. The approach is proactive in that it prevents future bugs of the same nature from other application from impacting the operation of the overall software system. It saves cost because defects that are resolved are passed on to other applications of the same behavior. In this manner, resolved bugs are coded in a more standardized way. The approach also assists the software development team in tracking customer or field defects by automated service records. The system also advantageously provides code snippet management including the capability to identify code snippets and to populate a database automatically with the identified information, as well as to associate code snippets with trouble ticket history.

As noted, the functionality described above may be implemented as a standalone approach, e.g., a software-based function executed by a processor, or it may be available as a managed service (including as a web service via a REST or SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the described functions may be hosted within or external to the cloud.

Still more generally, the subject matter described herein can take the form of an entirely hardware embodiment, an entirely software embodiment or an embodiment containing both hardware and software elements. In a preferred embodiment, the workflow recording and playback functions are implemented in software, which includes but is not limited to firmware, resident software, microcode, and the like. The data can be configured into a data structure (e.g., an array, a linked list, etc.) and stored in a data store, such as computer memory. Furthermore, as noted above, the recording and playback functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the automated tagging and tracking components are implemented in a special purpose computer, preferably in software executed by one or more processors. The associated snippet data is stored in an associated data store. The software also is maintained in one or more data stores or memories associated with the one or more processors, and the software may be implemented as one or more computer programs.

The search, tagging and tracking function referenced herein may be implemented as an adjunct or extension to an existing configuration management system or module, version management system or module, change management system or module, trouble ticket system or module, snippet management system or module, or the like. More generally, the described functionality may comprise a component of a software development environment solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The invention claimed is:

1. A method of source code management in a computer system, comprising:
    in response to receipt of information associated with a correction of a defect in a code snippet, automatically scanning a codebase to identify one or more instances of the code snippet; and
    for each of the one or more instances of the code snippet identified by the scan, tagging the instance for subsequent correction.

2. The method as described in claim 1 wherein the tagging generates a change record (CR).

3. The method as described in claim 2 wherein the change record is generated in a change management system.

4. The method as described in claim 3 further including maintaining an association between the change record in the change management system and information about the code snippet in a software development environment.

5. The method as described in claim 1 wherein the scanning comprises:
    specifying a search; and
    executing the search against the codebase, or a portion of the codebase, using a duplicate detection method, to identify the one or more instances of the code snippet.

6. The method as described in claim 1 wherein the defect is identified in a customer problem management report (PMR) in a software system, and the method further includes:
    identifying a source of the defect as being the code snippet; and
    rectifying the defect.

7. The method as described in claim 1 wherein the one or more instances of the code snippet includes snippets that are similar to the code snippet within a configurable degree of similarity.

8. The method as described in claim 1 wherein the defect is identified in a trouble ticket that is specific to the code snippet executing in a first computing entity in which the defect arose, and the tagging generates a change record associated with a software development environment, the change record identifying an instance of the code snippet executing in a second computing entity distinct from the first computing entity.

* * * * *